US011447168B1

(12) United States Patent
Ferrer et al.

(10) Patent No.: US 11,447,168 B1
(45) Date of Patent: Sep. 20, 2022

(54) MOTORIZED STROLLER HAVING A PLATFORM AND ERGONOMIC MEANS

(71) Applicant: Ferrergari LLC., Miami, FL (US)

(72) Inventors: Christian Ferrer, Miami, FL (US); Yessenia Ferrer, Miami, FL (US)

(*) Notice: Subject to any disclaimer, the term of this patent is extended or adjusted under 35 U.S.C. 154(b) by 0 days.

(21) Appl. No.: 17/366,361

(22) Filed: Jul. 2, 2021

(51) Int. Cl.
*B60K 1/00* (2006.01)
*B62B 5/00* (2006.01)
*B62B 9/20* (2006.01)
*B62B 9/10* (2006.01)
*B62B 7/00* (2006.01)
*B62B 7/04* (2006.01)
*B62B 9/14* (2006.01)

(52) U.S. Cl.
CPC .......... *B62B 5/0069* (2013.01); *B62B 5/0053* (2013.01); *B62B 7/008* (2013.01); *B62B 7/042* (2013.01); *B62B 9/106* (2013.01); *B62B 9/142* (2013.01); *B62B 9/20* (2013.01); *B62B 2202/42* (2013.01)

(58) Field of Classification Search
CPC ... B62B 5/0069; B62B 5/0053; B62B 5/0026; B62B 5/0033; B62B 5/0036; B62B 5/0046; B62B 5/0013; B62B 5/0016; B62B 5/04; B62B 5/0438; B62B 5/0447; B62B 5/08; B62B 5/082; B62B 5/087; B62B 7/00; B62B 7/008; B62B 7/042; B62B 7/04; B62B 9/106; B62B 9/142; B62B 9/20; B62B 9/08; B62B 9/085; B62B 9/14; B62B 9/145; B62B 9/24; B62B 2202/42
See application file for complete search history.

(56) References Cited

U.S. PATENT DOCUMENTS

| | | | | | |
|---|---|---|---|---|---|
| 5,873,425 | A | * | 2/1999 | Yang | B62B 9/00 180/65.6 |
| 5,937,961 | A | * | 8/1999 | Davidson | B62B 9/00 180/166 |
| 6,042,129 | A | * | 3/2000 | Simpo | B62B 9/18 280/47.38 |
| 6,139,046 | A | * | 10/2000 | Aalund | B62B 7/08 280/47.38 |
| 6,148,942 | A | * | 11/2000 | Mackert, Sr. | B62B 9/00 180/65.6 |
| 7,004,272 | B1 | * | 2/2006 | Brown | B60K 1/00 280/32.7 |

(Continued)

*Primary Examiner* — James M Dolak
(74) *Attorney, Agent, or Firm* — Sanchelima & Associates, P.A.; Christian Sanchelima; Jesus Sanchelima

(57) ABSTRACT

A motorized stroller for a theme park including a platform and an ergonomic configuration. The platform enables an operator to stand thereon in order to use it for automated travel. A touch screen display is accessed from the platform to illustrate attraction location, wait times, time, date, local dining, and online ordering options. Additionally, a user may also operate steering of the stroller when standing on the platform. The steering mechanism of the stroller includes a right handle which is manually rotated in a backwards motion to accelerate the stroller in a forward direction. A left handle may be rotated backwards for a reverse motion. Furthermore, the steering wheel includes brake handles to bring the stroller to a stop. In the present embodiment the steering handle also comprises of a key entry to turn the stroller on and off as well as a horn.

14 Claims, 12 Drawing Sheets

(56) References Cited

U.S. PATENT DOCUMENTS

| | | | | |
|---|---|---|---|---|
| 7,690,675 | B2 * | 4/2010 | Britton | B60N 2/2806 280/658 |
| 7,748,728 | B2 * | 7/2010 | Dixon | B62K 7/00 280/288.1 |
| 7,987,933 | B1 * | 8/2011 | McClellan | B60K 1/00 180/65.1 |
| 8,029,007 | B2 * | 10/2011 | Jones | B62D 63/00 280/47.131 |
| 8,033,348 | B1 * | 10/2011 | Parkhe | B62B 9/085 180/19.1 |
| 8,070,180 | B2 * | 12/2011 | Stiba | B62B 9/28 280/47.38 |
| 8,500,152 | B2 * | 8/2013 | Thorne | B62B 9/005 280/642 |
| 8,757,646 | B2 * | 6/2014 | Coleraine | A61G 5/10 280/47.4 |
| 9,205,882 | B1 * | 12/2015 | Hoffman | B66F 9/06 |
| 9,227,650 | B2 * | 1/2016 | Gillett | B62B 9/28 |
| 9,656,682 | B2 * | 5/2017 | Ahlemeier | B62B 9/00 |
| 9,669,858 | B2 * | 6/2017 | Washington | B62B 5/0076 |
| 9,701,329 | B2 * | 7/2017 | Johnson | B62B 3/001 |
| 9,731,760 | B2 * | 8/2017 | Ito | B62D 1/02 |
| 9,738,300 | B2 * | 8/2017 | Georgiev | B62B 9/00 |
| 9,789,894 | B2 * | 10/2017 | Weber | B62B 9/00 |
| 9,868,456 | B2 | 1/2018 | Stiba | |
| 9,889,872 | B2 * | 2/2018 | Somerset | B62B 7/12 |
| 10,328,965 | B2 * | 6/2019 | Britton | B62B 9/104 |
| 10,696,316 | B1 * | 6/2020 | Parks | B62D 51/04 |
| 10,913,479 | B1 * | 2/2021 | Cardentey | B62B 7/042 |
| 11,161,538 | B2 * | 11/2021 | McLean | H01M 50/20 |
| 11,220,282 | B2 * | 1/2022 | Chaudeurge | B62B 9/082 |
| 11,318,973 | B2 * | 5/2022 | Kelly | B62B 5/0013 |
| 11,325,633 | B2 * | 5/2022 | Britton | B62B 9/104 |
| 2006/0237932 | A1 * | 10/2006 | Moore | B62B 7/00 280/47.41 |
| 2010/0052373 | A1 * | 3/2010 | Kono | B62B 7/145 297/130 |

* cited by examiner

MOTORIZED STROLLER HAVING A PLATFORM AND ERGONOMIC MEANS

BACKGROUND OF THE INVENTION

1. Field of the Invention

The present invention relates to a motorized stroller and, more particularly, to a motorized stroller that includes a platform and ergonomic means.

2. Description of the Related Art

Several designs for a motorized stroller having a platform and ergonomic means have been designed in the past. None of them, however, include a motorized stroller that includes a platform and ergonomic means comprising a throttle handle bar with a touchscreen display mounted thereon. The platform enables an operator to stand thereon in order to use it for automated travel. A touch screen display is accessed from the platform to illustrate attraction location, wait times, time, date, local dining, and online ordering options. Additionally, a user may also operate steering of the stroller when standing on the platform. The steering mechanism of the stroller includes a right handle which is manually rotated in a backwards motion to accelerate the stroller in a forward direction.

Applicant believes that a related reference corresponds to U.S. Pat. No. 9,868,456 issued for a stroller system comprising an expandable base, two frame members, and a platform. Applicant believes that another related reference corresponds to U.S. Pat. No. 9,656,682 issued for a stroller system comprising a stroller frame, three or more wheels, a housing unit, a motor coupled to the frame, a brake coupled to at least one of the wheels, a handgrip bar, and a step. None of these references, however, teach of a motorized stroller having a platform and ergonomic means.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a motorized stroller having a platform and ergonomic means that includes a handle bar with a display screen mounted thereon.

It is another object of this invention to provide a motorized stroller having a platform and ergonomic means that includes a collapsible covering mounted to a front end of the stroller.

It is still another object of the present invention to provide a motorized stroller having a platform and ergonomic means that includes a sun shade for a user.

It is still another object of the present invention to provide a motorized stroller having a platform and ergonomic means that includes seatbelts for passengers within the cabin of the stroller.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
FIG. 1 represents an isometric front view of the stroller system 10 depicting the cover assembly 40 mounted onto the frame assembly 20 with the cover assembly 40 in an actuated configuration in accordance with an embodiment of the present invention.
Figure 2:
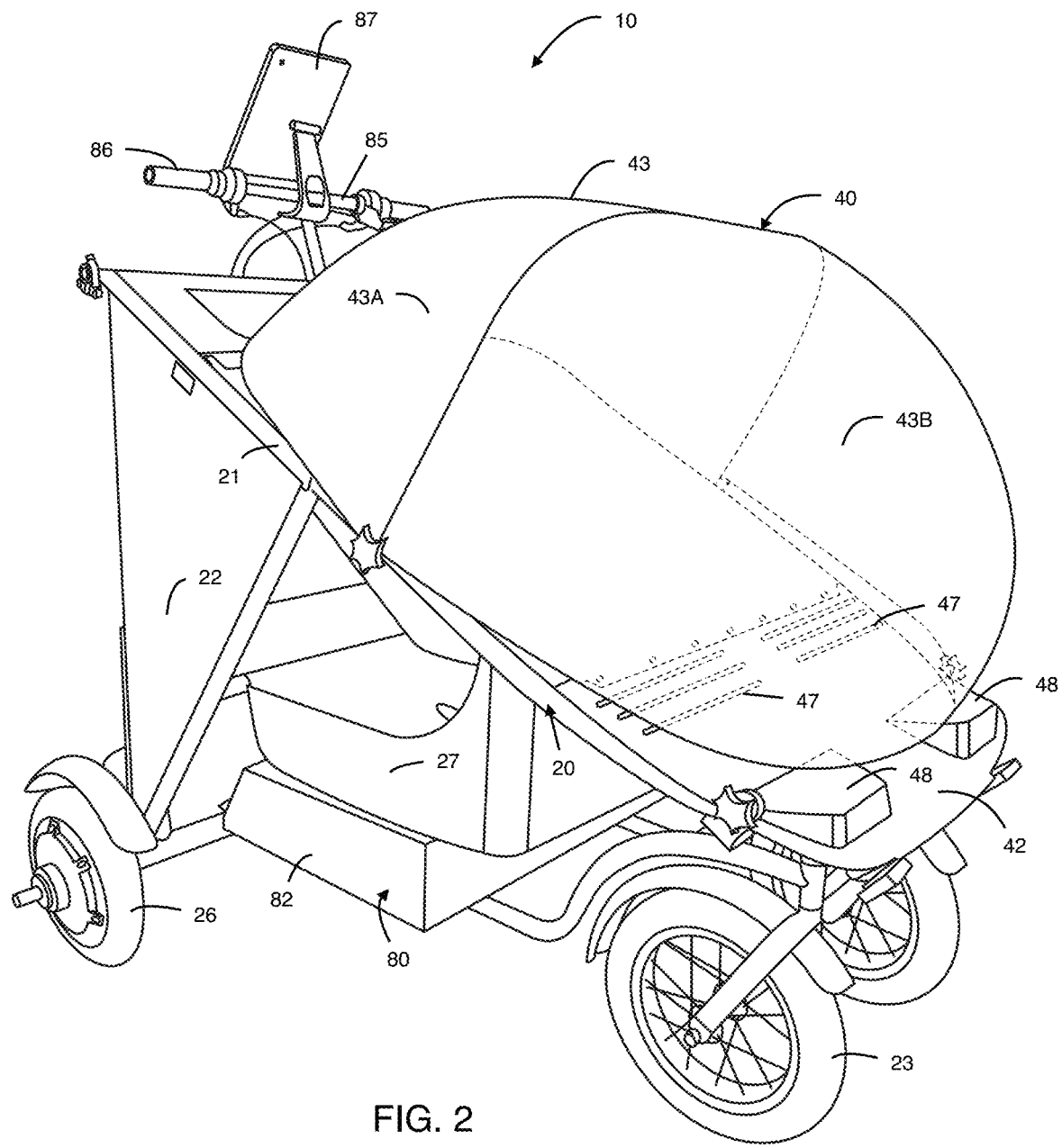
FIG. 2 shows another isometric front view of the stroller system 10 depicting the cover assembly 40 mounted onto frame assembly 20 depicting a storage compartment embedded within the frame assembly 20 in accordance with an embodiment of the present invention.
Figure 3:
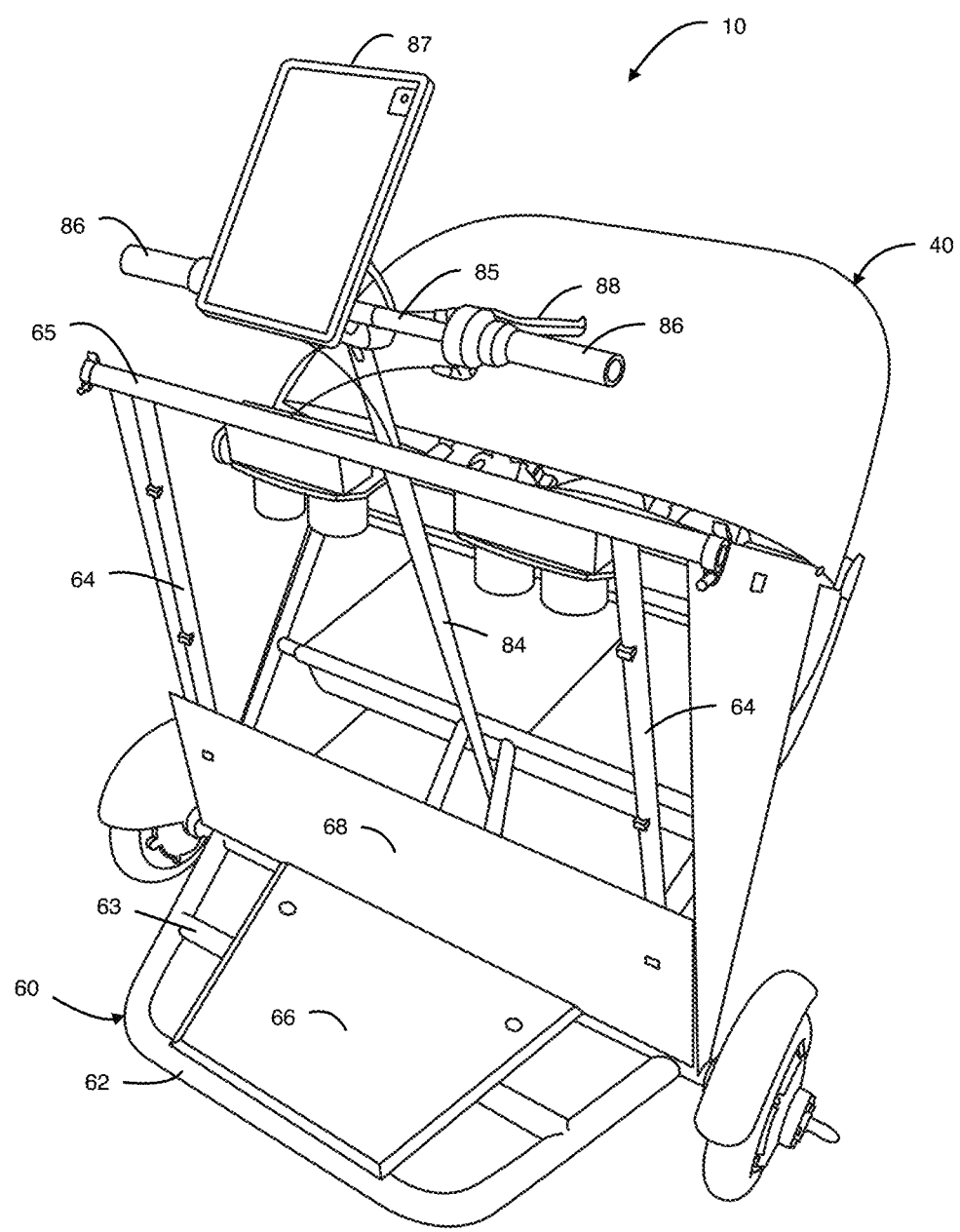
FIG. 3 illustrates an isometric rear view of the stroller system 10 depicting the platform assembly 60 engaged with the frame assembly 20 and further depicting an external device mounted to a handlebar of a handlebar assembly 80 in accordance with an embodiment of the present invention.

Referring now to the drawings, where the present invention is generally referred to with numeral 10, it can be observed a stroller system 10 which basically includes a frame assembly 20, a cover assembly 40, a platform assembly 60, and a drive assembly 80.

Figure 4:
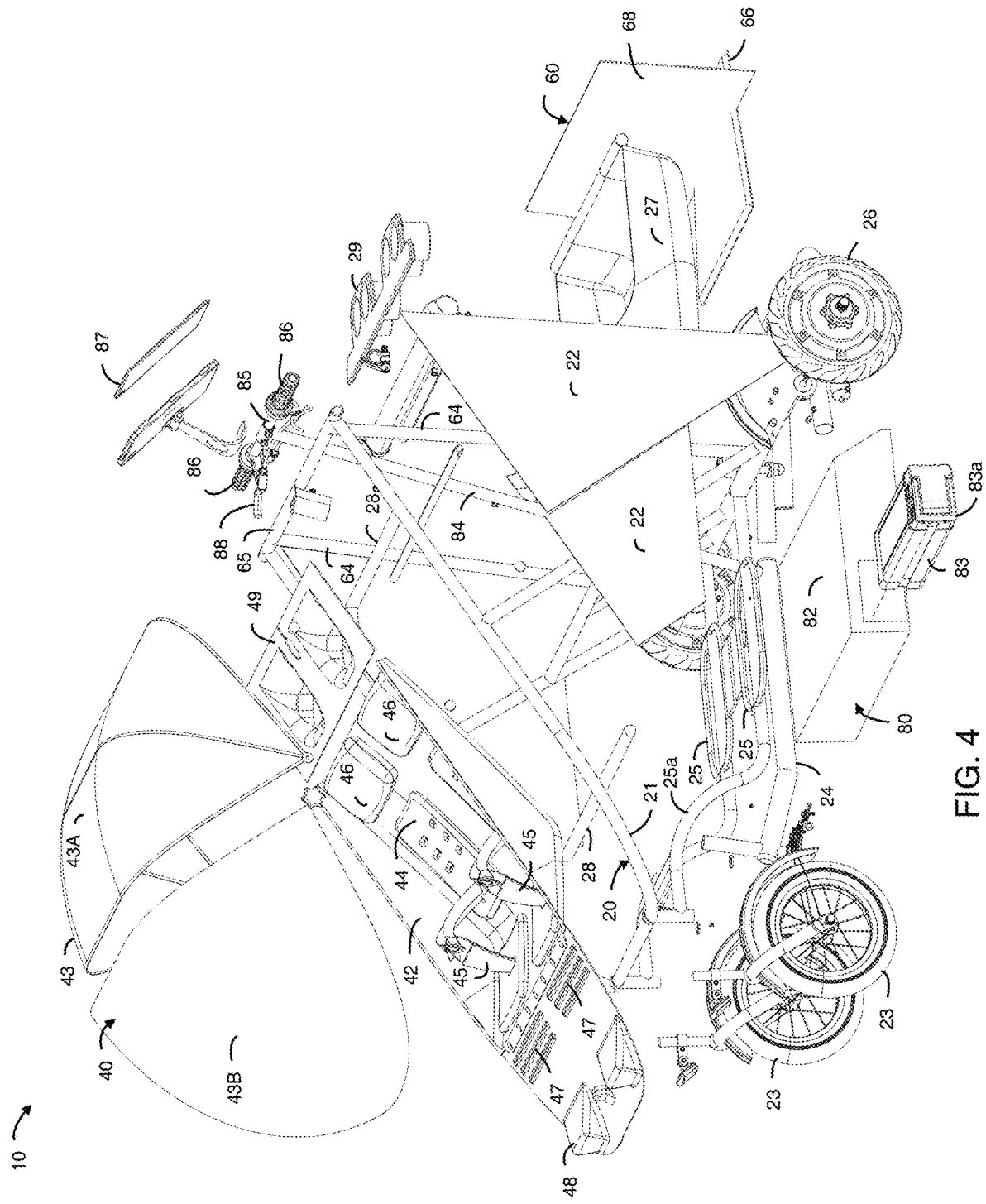
FIG. 4 is a representation of an exploded isometric view of the stroller system 10 depicting and exploded configuration for the frame assembly 20 and the cover assembly 40, the cover assembly 40 comprising a cabin with a collapsible roof in accordance with and embodiment of the present invention.
Figure 5:
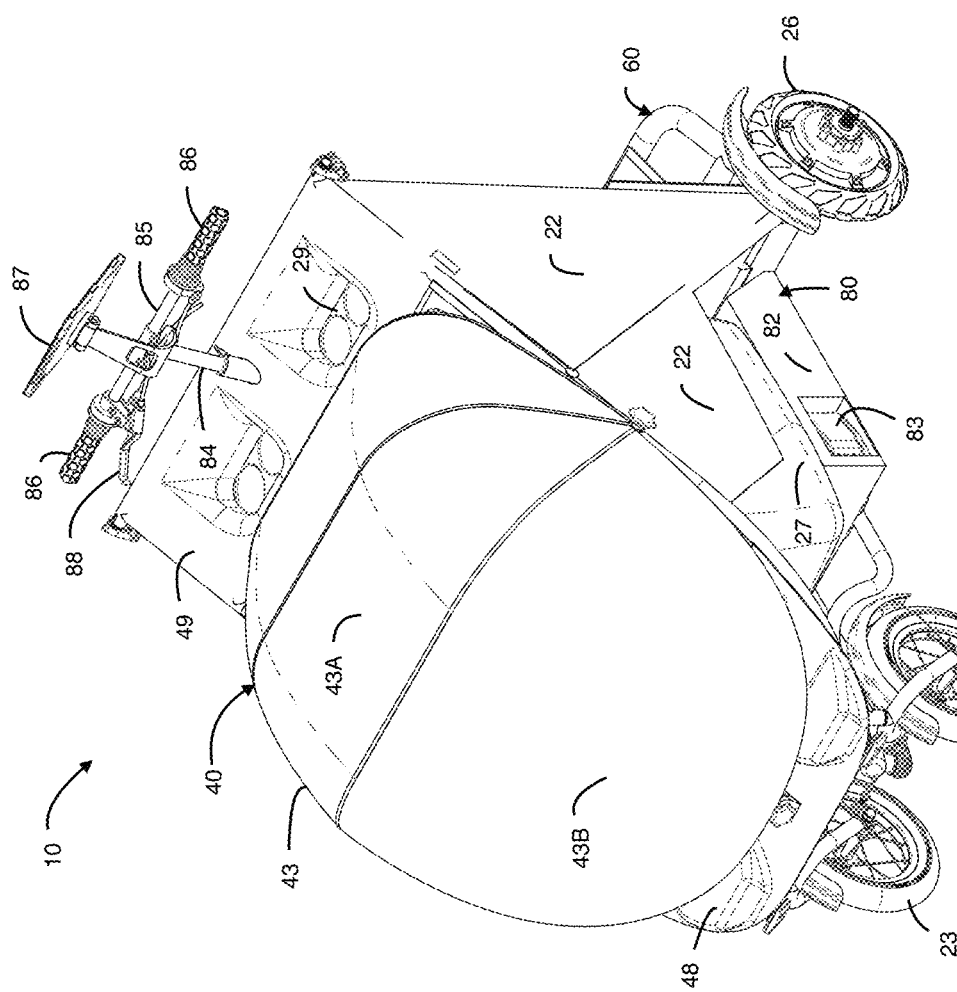
FIG. 5 shows another isometric front view of the stroller system 10 depicting the handlebar with the handle stein protruding from the frame assembly 20 in accordance with an embodiment of the present invention.
Figure 6:
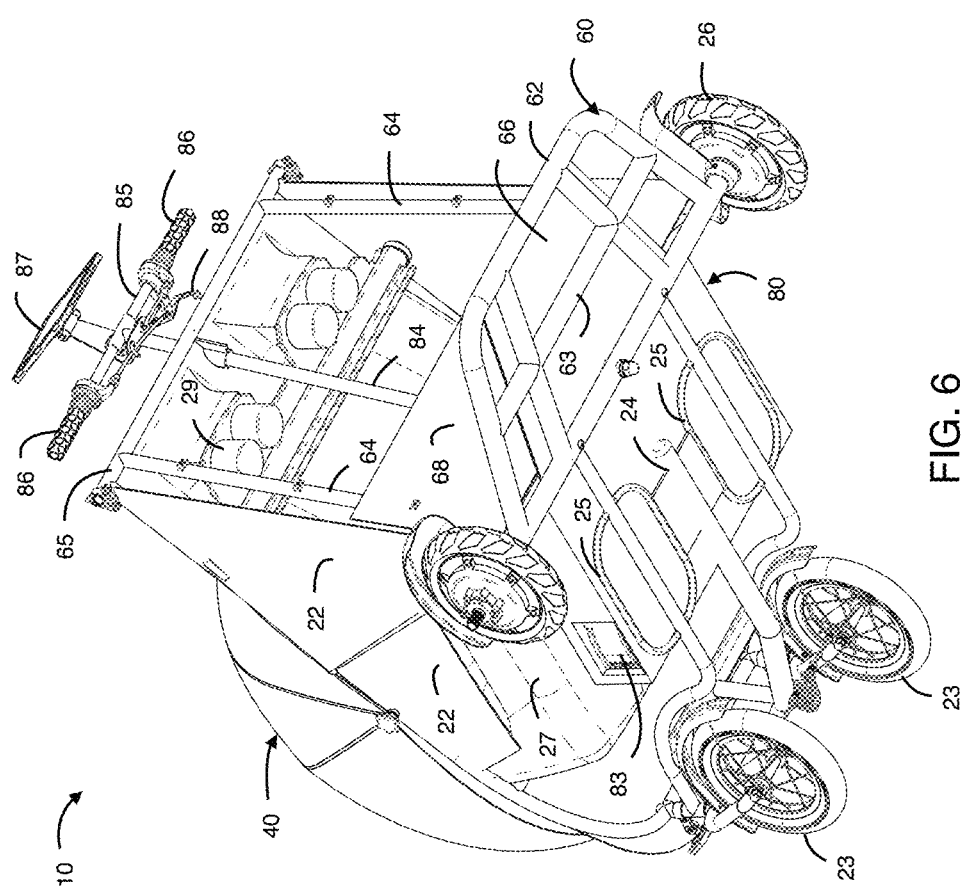
FIG. 6 illustrates an isometric rear view of the stroller system 10 depicting a bottom side of the frame assembly 20 having mounting supports 25 that support the motor 82 of the drive assembly 80 and further depicting the underside of the platform assembly 60 in accordance with an embodiment of the present invention.
Figure 7:
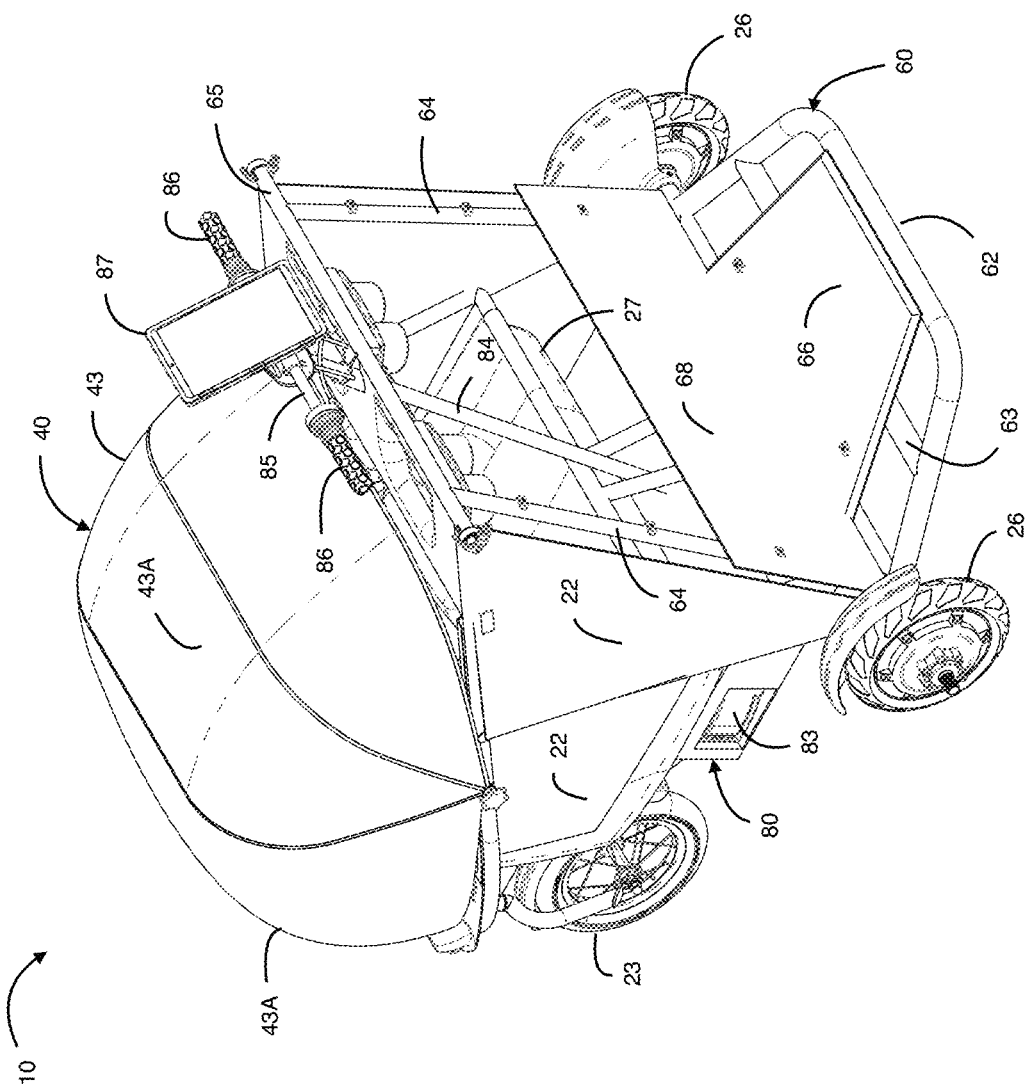
FIG. 7 represents another isometric rear view of the stroller system 10 depicting the base platform and the wall platform of the platform assembly 60 engaged onto the base rods of the platform assembly 60 in accordance with an embodiment of the present invention.
Figure 8:
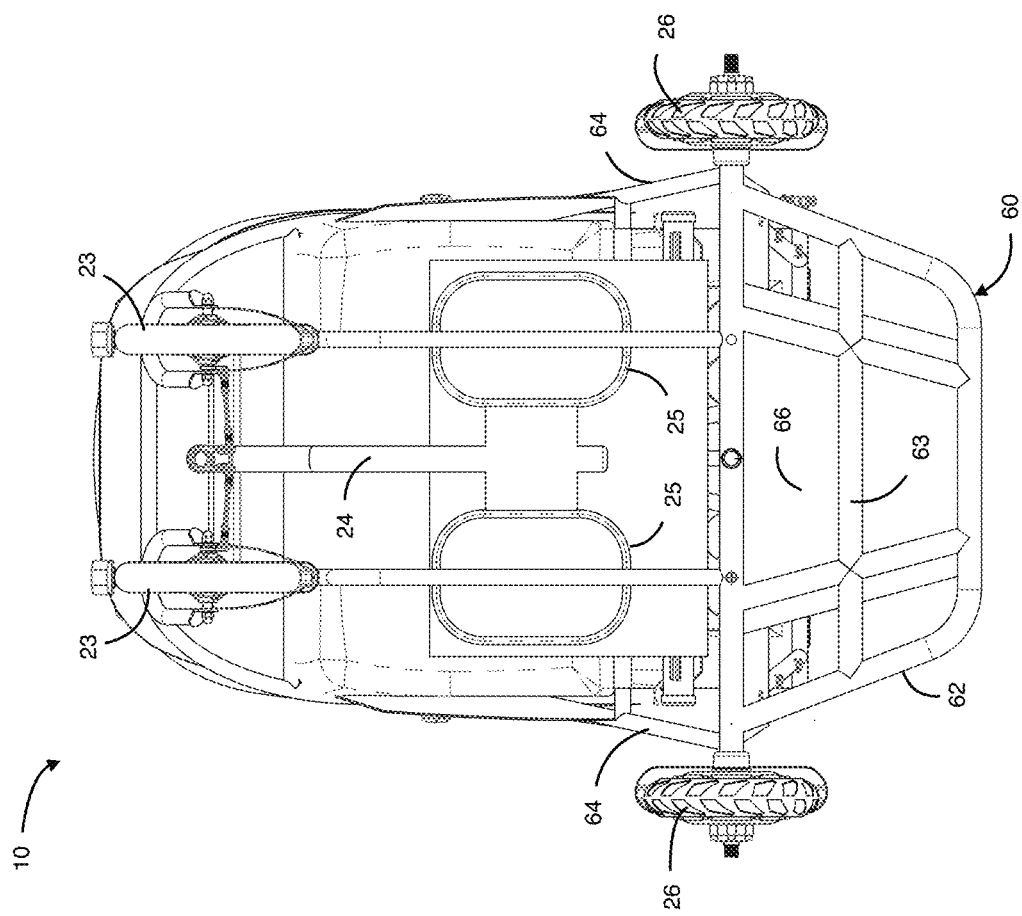
FIG. 8 shows a bottom plan view of the stroller system 10 depicting a bottom view of the platform assembly 60 with base rods supporting the base platform and further depicting the mounting supports that support the motor of the drive assembly in accordance with an embodiment of the present invention.
Figure 9:
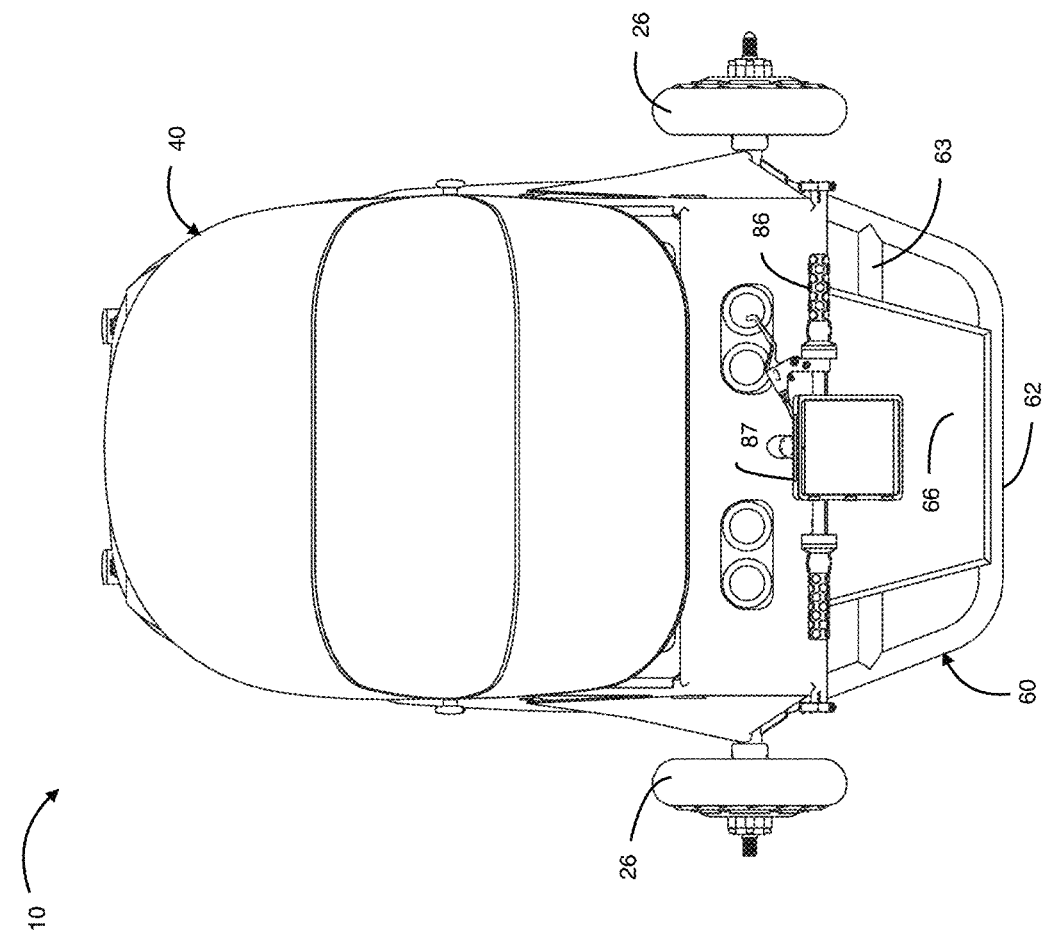
FIG. 9 illustrates a top plan view of the stroller system 10 depicting the cover assembly 40 in an actuated configuration and further depicting the drive assembly 80 extending from the top end of the frame assembly 20 in accordance with an embodiment of the present invention.
Figure 10:
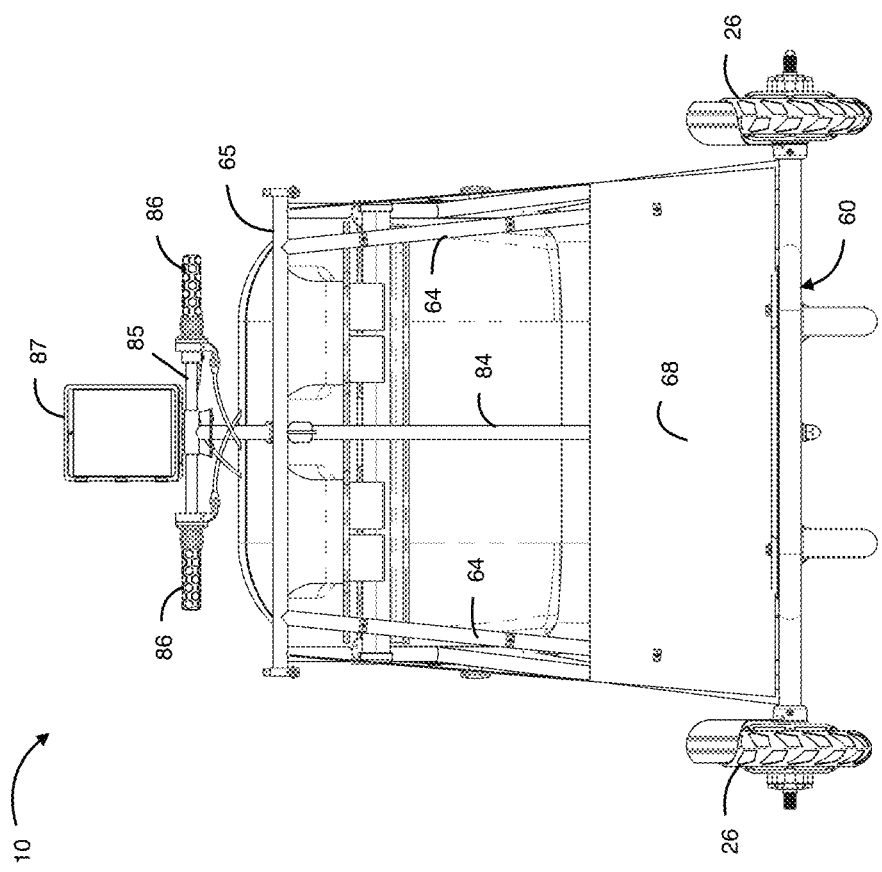
FIG. 10 is a representation of a rear plan view of the stroller system 10 depicting the external device secured to the handlebar of the drive assembly 80 and further depicting the wall rods of the platform assembly 60 in accordance with an embodiment of the present invention.
Figure 11:
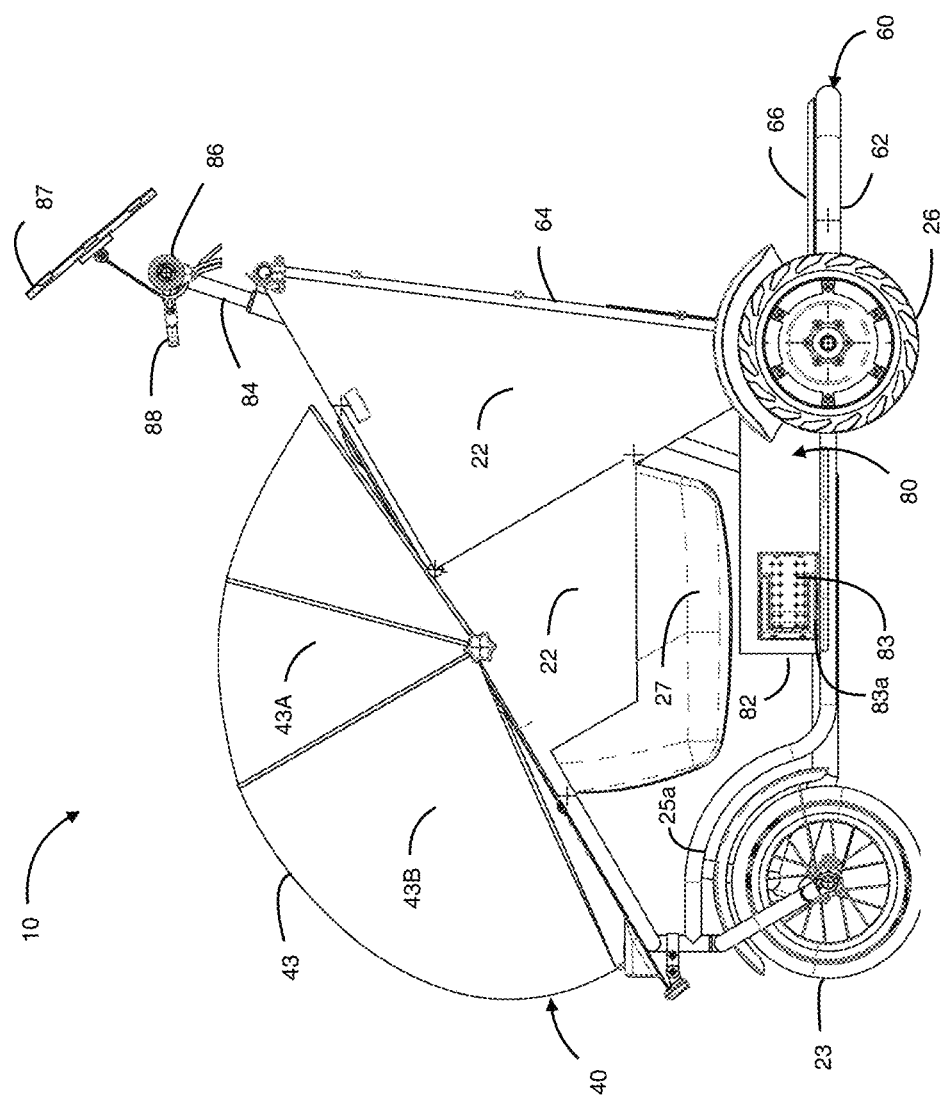
FIG. 11 shows a side plan view of the stroller system 10 depicting the placement of the storage compartment 27 within the frame assembly 20 and further depicting the motor mounted within the frame assembly 20 in accordance with an embodiment of the present invention.
Figure 12:
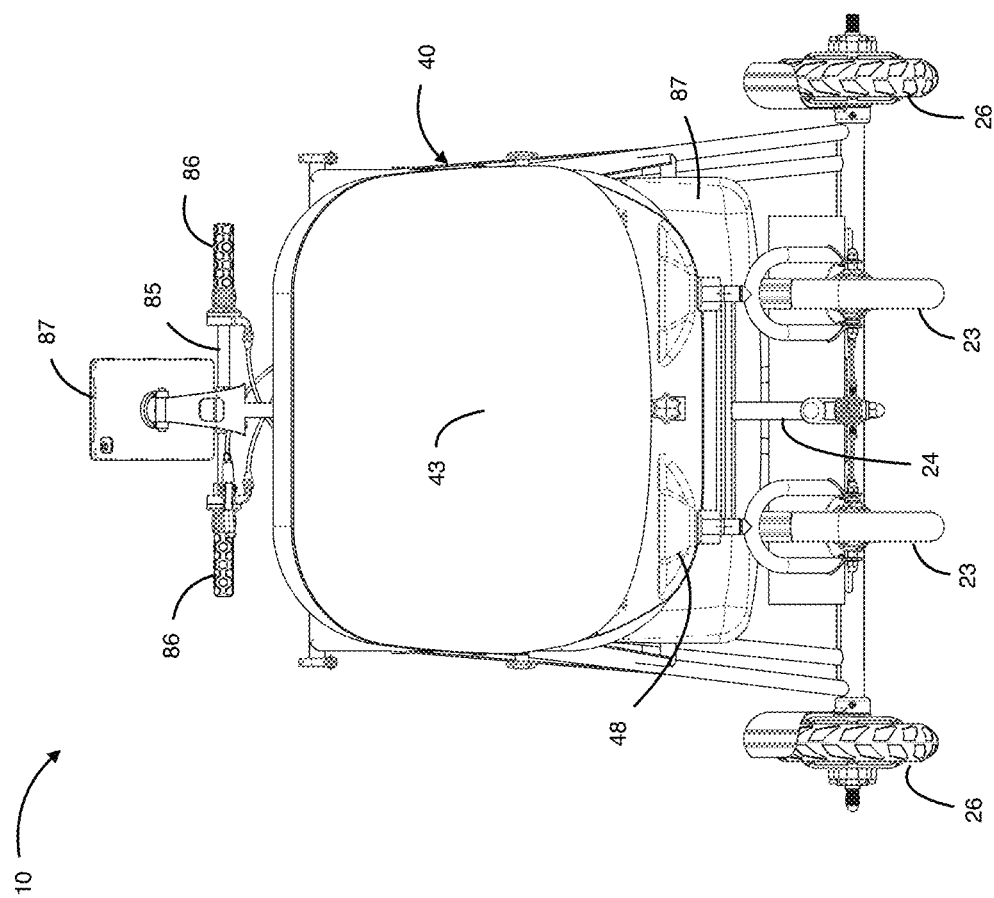
FIG. 12 illustrates a front plan view of the stroller system 10 depicting the front wheels engaged with the front wheel axis of the frame assembly 20 in accordance with an embodiment of the present invention.

Frame assembly 20 can be observed in FIG. 4 of the provided drawings. In the present embodiment, frame assembly 20 includes a frame 21 which can be provided in the shape of a triangular prism. Frame 21 includes a slanted operative top end and an operative bottom end. In the present embodiment, frame 21 can be comprised of a series of rod structures that are structured together to form define the frame. The frame 21 can be made of a metallic, plastic or any other suitable material. It should be understood that other shapes and sizes can be implemented for the frame 21. In the present embodiment, frame 21 further includes frame shielding 22 that is engaged to the outer portion from frame 21. Frame shielding can be provided as metal or plastic sheets that when mounted to the frame 21 define an outer surface of the frame. Frame shielding 22 protect the components positioned within the frame assembly. The shielding also prevents others from observing personal articles that may be stored within the frame assembly 20. In one implementation, frame shielding 22 can include various indicia and logos printed thereon. In one example, the frame shielding includes logos and indicia of a theme park, theme park ride, or fictional character for a respective theme park where the stroller system 10 is being implemented.

Frame assembly 20 further includes front wheels 23 that are coupled to a front wheel axis 24 as observed in FIG. 4 of the provided drawings. The front wheels can be provided as castor wheels disposed at the front end of the bottom operative end of the frame 21. Each of the wheels can also be provided with a respective wheel shield to protect the wheel. In the present implementation, the front wheel axis 24 extends into the interior of frame 21 and are further coupled to the drive assembly 80 in order to allow for a user to directionally adjust the front wheels 23 thereby allowing the stroller system 10 to turn any desired amount. Additionally, frame assembly 20 further includes mounting supports 25 that is portioned entirely above the front wheel axis 24 and is operatively engaged with the front wheels. In the present embodiment, mounting supports 25 comprise of oval platforms that are mounted onto curved extension rods 25a, the extension rods 25a extend to be coupled to the front wheels 23. Mounting supports 25 provide a suitable platform to support a motor of the drive assembly 80 entirely within the frame 21 of the frame assembly 20. It should be understood that any suitable platform can be provided within the frame 21 in order to comfortably support the drive assembly 80 therein.

Frame assembly 20 further includes rear wheels 26 that are configured to be coupled with the drive assembly 80 in order to implement a rear drive system. Other drive systems can be implemented into the present system. In one embodiment, frame assembly 20 further includes a storage compartment 27 that is supported entirely within the frame assembly 20. The storage compartment 27 can be provided as a rectangular container that is supported by the rods that define the frame 21. A lipped portion of the storage compartment is mounted to the rods in order to be supported thereon. Storage compartment 27 can be configured to store personal belongings and other items. In one implementation, storage compartment 27 is configured to store cover portion of the cover assembly 40 therein.

Frame assembly 20 further includes cabin support members 28 that are coupled within the frame 21. In one embodiment, cabin support members 28 are horizontal rods disposed within the frame that support the cover assembly 40 when mounted thereon. Cabin support members 28 can includes a first support member disposed at a top end of the slanted operative top end and a second support member disposed at a bottom end of the slanted operative top end of the frame 21. In the present embodiment, frame assembly 20 can also include cup holders 29 disposed at the operative top end of the frame 21. Cup holders 29 can be configured to hold a beverage.

Cover assembly 40 includes a cabin 42 which can be secured to the slanted operative top end of the frame 21. In one embodiment, cabin 42 can be provided as a slanted structural housing suitable two support children that cooperates with the shape of the operative top end of the frame 21. When secured with the frame 21, the bottom end of the cabin 42 is engaged with the cabin support members 28 of the frame 21. In the present embodiment, cabin 42 is configured such that it entirely covers the slanted operative top end of the frame 21. Cover assembly 40 further includes a collapsible roof 43 that is configured to entirely cover the cabin 42 to provide protection and privacy to children stored within the cabin. In one implementation, collapsible roof 43 comprises a first portion 43A and a second portion 43B. In the present embodiment, first portion 43A is provided as a ribbed roof portion that partially covers the top end of the cabin 42. First portion 43A extends from a top edge of the cabin 42 and partially extends therefrom. Furthermore, second portion 43B can be provided as a transparent cover portion that is removably mounted to the portion. Other embodiments can feature an opaque cover for second portion 43B. In the present embodiment, second portion 43B can be mounted onto the first portion 43A by way of any fastening means such as snap buttons, adhesives, hook and loop fasteners, and the like. In the present implementation, second portion 43B is configured to entirely cover the top end of the cabin 42 when mounted to the first portion 43A. Furthermore, second portion 43B is configured to be removable from the first portion 43A and can be stored within storage compartment 27. This allows for a user to configure stroller system 10 to a desired configuration.

Cover assembly 40 further includes seats 44 disposed within cabin 42 and are entirely covered by the collapsible roof 43. In the present embodiment, seats 44 are configured to suitably receive a user therein. The embodiment of the figures depicts seats 44 suitable to receive two children. It should be understood that cabin 42 and seats 44 can be modified to receive any number of seats and users. Seats 44 can be provided as padded seats being integral to cabin 42 in accordance with an embodiment of the present invention. Cover assembly 40 further includes a safety harness 45 provided for each of the seats 44. In the present embodiment, safety harness 45 is communicably coupled to the external device of the drive assembly 80. The external device 80 can notify a user operative the stroller 10 from the platform assembly 60 if a user within the cabin 42 has the safety harness 45 engaged or disengaged. In another embodiment, drive assembly 80 will not actuate the motor unless each of the safety harnesses 45 are engaged.

Cover assembly 40 further includes head rests 46 positioned above each of the seat 44. In one embodiment, head rests 46 are a cushioned portion which can comfortably support a user's head within the cabin 42. Additionally, ribbed supports 47 are positioned below each of the seats 44 in order to support a user's leg when secured within the cabin 42. Ribbed supports 47 can be provided as structural cylindrical protruding members from the surface of the cabin 42. Furthermore, cover assembly 40 includes a footrest 48 positioned underneath the ribbed supports 47 and provides a user with support for their feet when they are secured within the cabin 42. Footrest 48 can be rectangular portions extending from the surface of the cabin from the bottom end thereof. Other embodiments can feature footrests 48 that are mounted to the bottom end of the cabin 42. A support element 49 can be positioned above the headrests 46 of the cabin 42. Support element 49 can be provided as hollow containers to provide storage compartments to users secured within cabin 42.

Platform assembly 60 includes a base 62 extends from a rear end of the frame 21. In one embodiment, base 62 includes an n-shaped frame configuration as it extends outwardly from the rear end of the frame 21. Base 62 further includes base rods 63 that are aligned in a cross configuration located entirely within the n-shaped frame configuration of base 62. In one embodiment, base 62 can be provided as being made of plastic, metal, or any other suitable material. Furthermore, wall rods 64 can extend upwardly from a rear operative edge of the base 62 thereof. In one embodiment, wall rods 64 are provided as parallel rod structures that extend upwardly along the lateral sides of the rear end of the frame 21. Wall rods 64 can extend upwardly to the operative top end of the frame 21. Furthermore, a support rod 65 is operatively engaged with the wall rods 64 at the topmost end such that the support rod 65 is positioned parallel to the wall rods 64. Support rod 65 provides structural support and provides a user standing on the platform assembly 60 with additional support to grab onto in order to maintain balance. In the present implementation, a rectangular frame structure is defined on the rear end of the frame 21 when the base 62, wall rods 64, and support rod 65 are each coupled together.

Platform assembly 60 further includes a base platform 66 and a wall platform 68 that are coupled to the base 62 and the rectangular frame. In the present embodiment, base platform 66 is abuttingly engaged with the top end of the base 62 to provide a user with a platform to stand on. Furthermore, wall platform 68 is engaged to the rectangular frame formed on the platform assembly 60 such that the wall platform 68 partially covers the rectangular frame. In one implementation, base platform 66 and wall platform 68 are provided as being integral to each other. Furthermore, platform assembly 60 is coupled to the rear wheels 26 of the frame assembly 20.

Drive assembly 80 includes a motor 82 mounted to the bottom operative end of the frame 21. More specifically, motor 82 is mounted to the mounting supports 25 of the frame assembly 20. In the present embodiment, motor 82 is positioned such that it is located entirely between the mounting supports 25 and the storage compartment 27 of the frame assembly 20. Motor 82 can be operatively engaged with the rear wheels 26 of the frame 21 in order to provide a rear-wheel-drive configuration. Furthermore, motor 82 can be an electric motor that is powered by a battery 83 configured to be fitted within the motor housing. In one embodiment, battery 83 is a rechargeable electric battery that is removable from the motor housing. The battery 83 can include a battery handle 83a on a side end to allow a user to operatively remove the battery from the motor housing. In the present embodiment, battery 83 is accessed from a side end of the motor housing and remains exposed therefrom. Further, battery 83 can be positioned such that it remains flush with the outer surface of the motor housing. Mounting supports 25 support the motor 82 and battery 83 entirely within the confines of the frame 21.

Drive assembly 80 further includes a handlebar stein 84 that is operatively engaged with the front wheel axis 24 of the frame assembly 20. Handlebar stein 84 includes a topmost end and a bottommost end. In the present embodiment, the bottommost end is operative coupled to the front wheel axis 24 in order to enable the stroller system 10 to be maneuverable. A handlebar 85 is engaged at the topmost end of the handlebar stein 84 in order to provide driving controls for a user. In the present embodiment, as a user directionally adjusts the handlebar 85 the front wheels 24 will also be directionally adjusted due to the engagement of the handlebar stein 84 with the front wheel axis 24. The handlebar 85 further includes controls 86 which are communicably coupled to the motor 82. In one embodiment, controls 86 can be provided as rotatable handle controls to control the drive of the stroller system 10. For example, when twisting forward, the motor 82 can be actuated to move the stroller system 10 in a forward direction. Additionally, when twisting rearwardly, the motor 82 can be actuated to move the stroller system in a rearward direction. Other embodiments may feature different variations of controls 86 engaged with the handlebar 85. The handlebar 85 further includes brake controls 88 which can be operatively coupled to the wheels of the frame assembly 20. In the present embodiment, brake controls 88 can be actuated to apply a brake force to the stroller system 10 in order to bring the stroller to a complete stop.

Drive assembly 80 further includes an external device 87 mounted thereon. In the present embodiment, external device 87 is an electronic device with a display which is in communication with various structural elements of the stroller 10 via sensors. Furthermore, external device 87 can be in communication with a server to deliver notifications and information to a user. In one implementation, external device provides a user with a notification regarding the safety harness 45 of the cover assembly 40. A notification can be displayed on the external device 87 in the event that the safety harness is not actuated. Furthermore, motor 82 will need to actuated once all the safety harnesses 45 are detected to be engaged in accordance with one embodiment. In another implementation, stroller system 10 is implemented in a theme park setting. External device 87 is then in communication with a server to provide the device with a real time map of the park. The external device 87 can then display wait times for various rides and notify a user which areas of the theme park have the least congested traffic. In another embodiment, the external device 87 can provide a user with various restaurant locations and provide various menu items to allow a user to order items from the restaurant directly from the external device 87. Other implementations for the external device 87 can be appreciated for the present invention.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A stroller system, comprising:
   a. a frame assembly including a frame including a mounting support positioned on an operative bottom end of the frame;
   b. a platform assembly including a base extending outwardly from a rear bottommost end of the frame, wherein the base includes wall rods extending upwardly therefrom and a support rod horizontally positioned on the wall rods to define a rectangular frame, said base having a horizontal proximal end which is parallel to a horizontal distal end, wherein said wall platform spans an entire width of the rectangular frame, the platform assembly further includes a horizontal base platform abuttingly disposed at a top end of the base, wherein a wall platform integral to the base platform partially covers the rectangular frame, said wall platform is perpendicular to said base platform, the base platform in abutting contact with the base is configured to permit a user to stand thereon;
   c. a drive assembly including a motor supported on the mounting support of the frame assembly, wherein a handlebar including controls is operatively coupled to the motor;
   d. a cover assembly including a cabin, said cabin includes a seat mounted thereon, the seat includes a seat base and a seat back, and the seat includes a safety harness.

2. The stroller system of claim 1 wherein the frame is in the shape of a triangular prism, said frame further including front wheels and a frame shielding, said wheels separated by a predetermined distance, said frame shielding coupled thereon which defines an outer surface of the stroller system, wherein the mounting support is operatively coupled to the front wheels of the frame, said mounting support including two oval support platforms that are engaged with extension rods that are coupled to the front wheels.

3. The stroller system of claim 1 wherein the frame further includes rear wheels, wherein said rear wheels are separated by a predetermined distance which is greater than the predetermined distance that separates the front wheels, wherein the rear wheels are operatively engaged with the motor of the drive assembly, wherein the motor includes a rechargeable electric battery removable from the motor, said rechargeable electric battery provides power to the motor, said rechargeable electric battery including a handle member to facilitate removal therefrom.

4. The stroller system of claim 1 wherein the frame further includes a storage compartment removably disposed within the interior of the frame, wherein the storage compartment is entirely confined within the frame when disposed therein, wherein the frame assembly further includes cup holders located entirely above the storage compartment.

5. The stroller system of claim 1 wherein the drive assembly further includes a handlebar stem, wherein the handlebar is operatively engaged to a topmost end of the handlebar stem, wherein a bottom most end of the handle bar stem is operatively engaged with a front wheel axis, wherein the front wheel axis is engaged with the front wheels.

6. The stroller system of claim 1 wherein the controls of the handlebar include forward motion controls, reverse motion controls, and a brake mechanism, wherein the forward motion controls and the reverse motion controls are rotatable handlebar controls that are actuated with a twisting motion.

7. The stroller system of claim 1 wherein the base further includes base rods, said base extends normally from the rear end of the frame, wherein the base rods extend in a cross configuration within the base, wherein the base is coupled to rear wheels of the frame.

8. The stroller system of claim 1 wherein said cabin includes a collapsible roof, wherein the frame further includes cabin support members disposed within the frame, wherein a bottom end of the cabin is operatively engaged with the cabin support members of the frame, wherein the collapsible roof is removable and storable within a storage compartment of the frame assembly.

9. The stroller system of claim 8 wherein said collapsible roof includes a first portion and a second portion, wherein the first portion is a ribbed roof portion that is extendable to partially cover a top end of the cabin, wherein the second portion is a transparent cover portion coupled to the first portion which entirely covers the cabin when mounted thereon.

10. The stroller system of claim 1 wherein the safety harness has a first harness end attached to a base of the seat and a second harness end attached to the seat back, wherein a headrest is disposed above the seat, said cabin further including ribbed supports disposed entirely below the seat on the cabin, wherein a footrest is disposed entirely below the ribbed supports of the cabin.

11. A stroller system, consisting of:
   a. a frame assembly including a frame, a slanted operative top end and an operative bottom end, wherein the frame further includes cabin support members located entirely within the frame below the slanted operative top end, said frame further including a mounting support positioned on the operative bottom end of the frame, wherein the frame is in the shape of a triangular prism, said frame further including frame shielding coupled thereon which defines an outer surface of the stroller system, wherein the mounting support is operatively coupled to front wheels of the frame, said mounting support including two oval support platforms that are engaged with extension rods that are coupled to the front wheels;
   b. a cover assembly including a cabin having a collapsible roof, wherein a bottom end of the cabin is operatively engaged with the cabin support members of the frame, wherein the collapsible roof is removable and storable within a storage compartment of the frame assembly, wherein said collapsible roof includes a first portion and a second portion, wherein the first portion is a ribbed roof portion that is extendable to partially cover a top end of the cabin, wherein the second portion is a transparent cover portion coupled to the first portion which entirely covers the cabin when mounted thereon, wherein the cabin includes a plurality of seats disposed thereon, wherein each of the seats includes a safety harness having a first harness end attached to a base of the seat and a second harness end attached to a seat back, wherein headrests are disposed above each of the seats, said cabin further including ribbed supports disposed entirely below the seats on the cabin, wherein footrests are disposed entirely below the ribbed supports of the cabin;
   c. a platform assembly including a base extending from a rear end of the frame, wherein the base includes wall rods extending upwardly therefrom and a support rod horizontally positioned on the wall rods to define a rectangular frame, wherein a base platform is abuttingly disposed at a top end of the base, wherein a wall platform integral to the base platform partially covers the rectangular frame, the base further includes base rods, said base extends normally from the rear end of the frame, wherein the base rods extend in a cross configuration within the base, wherein the base is coupled to rear wheels of the frame; and d. a drive assembly including a motor supported on the mounting support of the frame assembly, wherein the motor is located entirely within the frame, wherein a handlebar including controls is operatively coupled to the motor, wherein the handle bar further includes an external device mounted thereon displaying theme park maps, theme park restaurant menus, and theme park wait times, wherein the frame further includes rear wheels, wherein the rear wheels are operatively engaged with the motor of the drive assembly, wherein the motor includes a rechargeable electric battery removable from the motor, said rechargeable electric battery provides power to the motor, said rechargeable electric battery including a handle member to facilitate removal therefrom.

12. The stroller system of claim 1, wherein the horizontal proximal end is greater in width than said horizontal distal end.

13. The stroller system of claim 1, wherein said platform assembly is flush with the base.

14. A stroller system, comprising:
a. a frame assembly including a frame including a mounting support positioned on an operative bottom end of the frame;
b. a platform assembly including a base extending outwardly from a rear bottommost end of the frame, said base having a horizontal proximal end which is parallel to a horizontal distal end, wherein the proximal end is greater in width than said distal end, said base further includes base rods within said base, wherein the base includes wall rods extending upwardly from distal edges of the proximal end of the base and a support rod horizontally positioned on the wall rods opposite to the base to define a rectangular frame, the platform assembly further includes a horizontal base platform abuttingly disposed at a top end of the base, wherein a wall platform integral to the base platform partially covers the rectangular frame, said wall platform is perpendicular to said base platform, said wall platform spans an entire width of the rectangular frame, the base platform in abutting contact with the base is configured to permit a user to stand thereon;
c. a drive assembly including a motor supported on the mounting support of the frame assembly, wherein a handlebar including controls is operatively coupled to the motor; and
d. a cover assembly including a cabin, said cabin includes seats mounted thereon, each seat includes a seat base and a seat back, and each seat includes a safety harness, the safety harness has a first harness end attached to a base of each of the seats and a second harness end attached to a seat back of each of the seats, said cabin includes a collapsible roof, wherein the frame further includes cabin support members disposed within the frame, wherein a bottom end of the cabin is operatively engaged with the cabin support members of the frame.

* * * * *